United States Patent [19]

McAbian

[11] Patent Number: 5,845,261
[45] Date of Patent: Dec. 1, 1998

[54] INTERACTIVE MULTI-MEDIA PRESENTATION AND MARKETING APPARATUS

[76] Inventor: Adi Jacob McAbian, 18630 Canasta St., Tarzana, Calif. 91356

[21] Appl. No.: 662,060

[22] Filed: Jun. 12, 1996

[51] Int. Cl.$^6$ ...................................................... G06F 13/00
[52] U.S. Cl. ............................ 705/26; 345/326; 345/329; 345/335; 395/200.33
[58] Field of Search ................................. 705/26, 27, 34; 345/326, 327, 329, 335; 395/200.33, 200.61

[56] References Cited

U.S. PATENT DOCUMENTS

| | | |
|---|---|---|
| 4,015,366 | 4/1977 | Hall, III . |
| 4,305,131 | 12/1981 | Best . |
| 4,381,544 | 4/1983 | Stamm . |
| 4,750,151 | 6/1988 | Baus . |
| 5,053,956 | 10/1991 | Donald . |
| 5,295,181 | 3/1994 | Kuo . |
| 5,313,013 | 5/1994 | Suzuki et al. . |
| 5,342,054 | 8/1994 | Chang . |
| 5,374,999 | 12/1994 | Chuang et al. . |
| 5,408,417 | 4/1995 | Wilder . |
| 5,493,105 | 2/1996 | Desai . |
| 5,710,887 | 1/1998 | Chelliah et al. ........................ 395/226 |

Primary Examiner—Thomas Peeso
Attorney, Agent, or Firm—Thomas I. Rozsa; Tony D. Chen

[57] ABSTRACT

An interactive multi-media presentation and marketing apparatus for a business entity to present its products to an audience, and to monitor and track the responses from the audience. The apparatus includes a self-contained stand-alone housing for containing a computer, a touch-screen monitor, and a business card scanner. When a user inserts the user's business card into the business card slot on the housing, the computer is programmed to operate the business card reader for scanning, and to retrieve and store information on the business card of the user. When the user elects to type-in the user's information on the touch-screen monitor, the computer is programmed to operate the touch-screen monitor for receiving, retrieving and storing information typed-in by the user. The computer has massive data storage and retrieval devices for storing and retrieving information on the business entity's products, and is programmed to present the information to the user based on the user's request. The computer is further programmed to track all responses and activities of the user and record the responses and activities in a retrievable record which is marked with indicia for identifying the record with the user's available information.

38 Claims, 6 Drawing Sheets

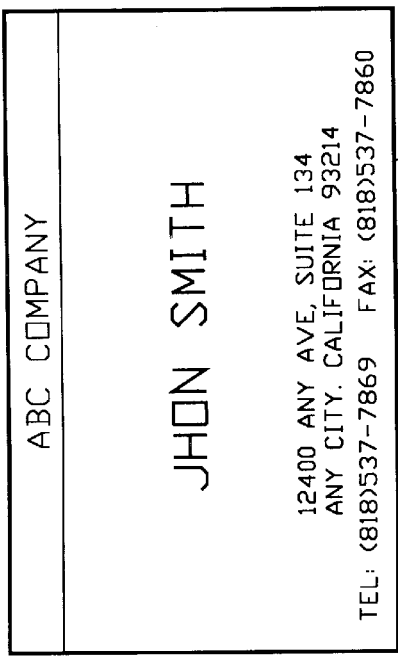
FIG.13
FIG.15
FIG.14

INTERACTIVE MULTI-MEDIA PRESENTATION AND MARKETING APPARATUS

BACKGROUND OF THE INVENTION

1. Field of the Invention

The present invention relates to the field of computer-related business equipment and systems. More particularly, the present invention relates to the field of computerized presentation and marketing apparatus.

2. Description of the Prior Art

The following eleven (11) patents are found to be pertinent in the field of art of the present invention:

1) U.S. Pat. No. 4,015,366 issued to Hall, III on Apr. 5, 1977 for "Highly Automated Agricultural Production System" (hereafter "the Hall Patent");

2) U.S. Pat. No. 4,305,131 issued to Best on Dec. 8, 1981 for "Dialog Between TV Movies And Human Viewers" (hereafter "the Best Patent");

3) U.S. Pat. No. 4,381,544 issued to Stamm on Apr. 26, 1983 for "Process And Apparatus For Geotechnic Exploration" (hereafter "the Stamm Patent");

4) U.S. Pat. No. 4,750,151 issued to Baus on Jun. 7, 1988 "Apparatus For Selectively Retrieving Stored Information To A Plurality Of Output Units In Response To Touching Display Panel Areas Associated With The Information To Be Retrieved" (hereafter "the Baus Patent");

5) U.S. Pat. No. 5,053,956 issued to Donald et al. on Oct. 1, 1991 for "Interactive System For Retail Transactions" (hereafter "the Donald Patent");

6) U.S. Pat. No. 5,295,181 issued to Kuo on Mar. 15, 1994 for "Automatic Facsimile Output Recipient Telephoning System" (hereafter "the Kuo Patent");

7) U.S. Pat. No. 5,313,013 issued to Suzuki et al. on May 17, 1994 for "Tone Signal Synthesizer With Touch Control" (hereafter "the Suzuki Patent");

8) U.S. Pat. No. 5,342,054 issued to Chang et al. on Aug. 30, 1994 for "Gold Practice Apparatus" (hereafter "the Chang Patent");

9) U.S. Pat. No. 5,374,999 issued to Chuang et al. on Dec. 20, 1994 for "Scan Control System" (hereafter "the Chuang Patent");

10) U.S. Pat. No. 5,408,417 issued to Wilder on Apr. 18, 1995 for "Automated Ticket Sales And Dispensing System" (hereafter "the Wilder Patent"); and 11) U.S. Pat. No. 5,493,105 issued to Desai on Feb. 20, 1996 for "Electronic Business Card System" (hereafter "the Desai Patent").

The Hall Patent discloses a highly automated agricultural production system which is computer controlled for automatically performing all major agricultural production activities for the successful production of agricultural products from the planting of the same to the storage of the same ready for sale.

The Best Patent discloses a dialogue between TV movies and human viewers. It is a video amusement system wherein one or more viewers influence the course of a motion picture as if each viewer were a participant in a real life drama.

The Baus Patent discloses an apparatus for selectively retrieving stored information to a plurality of output units in response to touching display panel areas associated with the information to be retrieved. It comprises a computer and a storage unit which is used as an information and display system. It allows a user to select desired information stored in the storage unit. A large area contact or sensor bank assembly with an associated signal carrier are provided. Upon touching an area of the signal carrier, a signal is transmitted to the computer, where the computer commands the storage unit to release the information.

The Donald Patent discloses an interactive system for retail transactions. It comprises an image storing arrangement for storing images of items being traded, an image index arrangement connected with the storage arrangement and containing identifiers for the images therein, an image retrieval arrangement, a video screen display for displaying retrieved images, and a transaction data processing arrangement in which the displayed image identifier is automatically input from the index arrangement.

The Kuo Patent discloses an automatic facsimile output recipient telephoning system.

The Stamm Patent discloses a process and apparatus for geotechnic exploration.

The Suzuki Patent discloses a tone signal synthesizer with a touch control. It comprises a loop circuit which has a delay element and an all-pass filter circulates a tone signal. A driving waveform is applied to the loop circuit. The delay element provides a delay time corresponding to the pitch of the circulating tone signal and the all-pass filter is capable of changing the phase of the tone signal corresponding to its frequency. The resulting musical tone can be controlled with touch, thereby enabling the simulation of vibration of pitch and the generation of non-harmonic components caused by touch in a natural musical instrument.

The Chang Patent discloses a golf practice apparatus. The apparatus records and instantaneously plays back video images of a golfer's swing.

The Chuang Patent discloses a scan control system for controlling the scanning operation of a business card reader. The scan control system comprises a document sensor detector, a delay time circuit, a motor start drive, a motor drive counter, a start scan monitor, an error detector circuit, an end of scan circuit, an encoder control circuit, and a divide frequency circuit. The scan control system is connected to a computer for document filing.

The Wilder Patent discloses an automated ticket sales and dispensing system. The system comprises a terminal which has a monitor with an interactive touch-sensitive display screen. The display screen shows the customer a view of a stage or field as seen from the seating area of the seats which have been selected prior to the purchase with the ability to accept or select another seat. The system is menu driven and allows a user to select and purchase tickets by touching the screen in response to messages displayed on the interactive screen.

The Desai Patent discloses an electronic business card reader with a card-file management system for use with electronic business cards. The electronic business card reader is used in conjunction with the electronic business card and allows for total automation of the common functions that are completed manually with the conventional business card exchanges. The electronic business cards contain the information of a conventional business card and are easily modified with updated information. Data on a particular electronic business card can be stored by re-encoding the data on the business card. The electronic business card reader with its card-file management system allows easy input and manipulation of the information on the business card.

It is desirable to have a self-contained computerized multi-media apparatus as a presentation and marketing tool for business entities to introduce and promote their products and to monitor and track the responses by the audience.

SUMMARY OF THE INVENTION

The present invention is a self-contained computerized interactive multi-media presentation and marketing apparatus.

The present invention is a stand-alone kiosk-type presentation and marketing apparatus. The present invention apparatus utilizes computerized multi-media devices to present and introduce business entities' products or services to an interested user of the apparatus, and to monitor and track the user's responses and requests.

Described generally, the present invention is an interactive multi-media presentation and marketing apparatus for a business entity to present its products to an audience, and to monitor and track the responses from the audience. The present invention apparatus has a self-contained stand-alone housing for containing a computer, a touch-screen monitor, a business card scanner, a printer and at least one speaker. The housing has a front monitor window for the touch-screen monitor, and a business card slot for the business card scanner.

In the present invention, the computer is programmed to present at least one instruction screen requesting a user of the audience to make a selection of method for inputting information about the user. The computer is also electronically connected to the business card reader. When the user elects to insert and then inserts the user's business card into the business card slot on the housing, the computer is programmed to operate the business card reader for scanning and to retrieve and store information on the business card of the user. The computer is further electronically connected to the touch-screen monitor. When the user elects to type and then types the user's information on the touch-screen monitor, the computer is programmed to operate the touch-screen monitor for receiving, retrieving and storing information typed-in by the user.

In the present invention, the computer is also programmed to present at least one election screen on the touch-screen monitor to allow the user to make a selection of a specific product, and to allow the user to make a selection from a multiplicity of presenting options, including but not limited to viewing video presentation of the specific product on the monitor, receiving a hard-copy document about the specific product, and requesting subsequent delivery of further information with regard to the specific product.

In the present invention, the computer is further programmed to track all responses and activities of the user and record the response and activities in a retrievable record which is marked with indicia for identifying the record with the user's available information. These records and information can be later retrieved for marketing purposes.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 13 is an illustrative drawing showing a "farewell" screen displayed on the touch screen monitor of the present invention self-contained computerized interactive multi-media presentation and marketing apparatus.

FIG. 14 is an illustrative drawing showing a track file compiled by the present invention self-contained computerized interactive multi-media presentation and marketing apparatus.

FIG. 15 is an illustrative drawing of a business card scan image file with a bitmap file identification.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
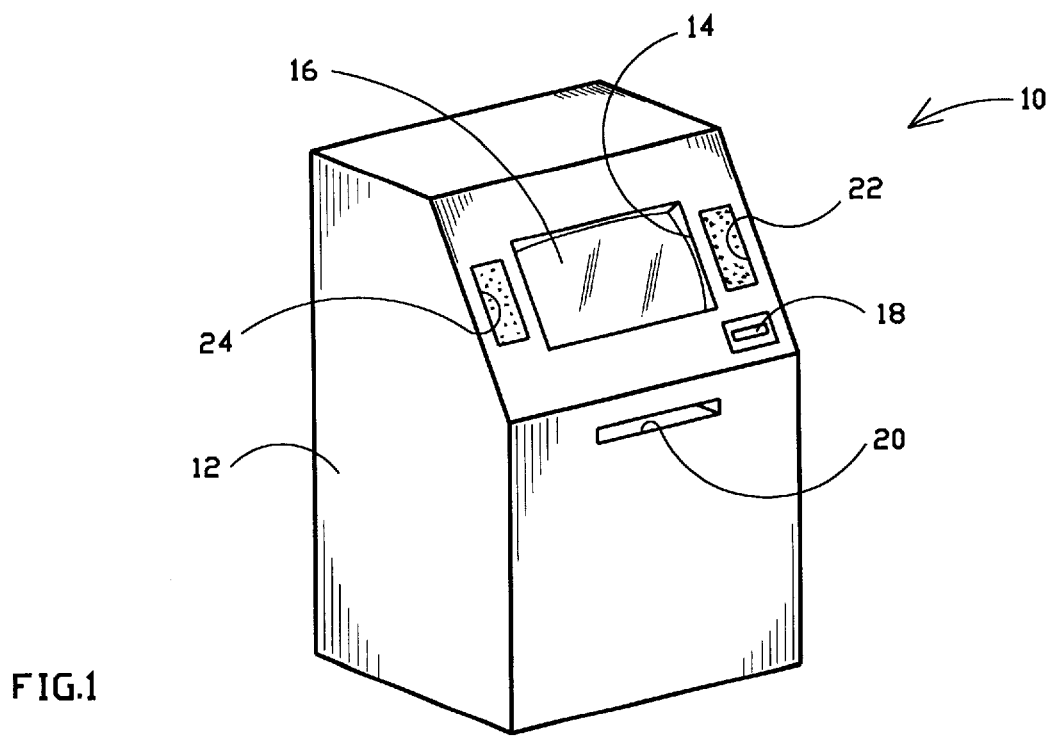
FIG. 1 is a perspective view of one embodiment of the present invention self-contained computerized interactive multi-media presentation and marketing apparatus.

Referring to FIG. 1, there is shown at 10 one embodiment of the present invention self-contained computerized interactive multi-media apparatus for a business entity to present its products to an audience, and to monitor and track the responses from the audience. The present invention apparatus 10 has a self-contained stand-alone housing 12 for containing a computer, a key-board, a touch-screen monitor, a business card scanner, a printer and one or more speakers, preferably two speakers including a right speaker and a left speaker.

The housing 12 has a front monitor window 14 for exposing the screen 16 of the touch-screen monitor, a business card slot 18 for inserting a business card into the business card scanner, a delivery opening 20 for receiving print-out from the printer, and two opposite apertures 22 and 24 for the right and left speakers, respectively.

The computer is suitably installed inside the housing 12. The touch-screen monitor is suitably installed behind the front window 14 such that its screen 16 can be seen and accessible through the front window 14. The business card scanner is suitably installed behind the slot 18 such that a business card can be inserted through the slot 18 and scanned by the scanner. The printer is suitably installed behind the opening 20 such that documents printed-out by the printer can be retrieved from the opening 20. The right and left speakers are suitably installed behind the two opposite apertures 22 and 24 respectively such that their sound can be heard outside of the housing 12. The apertures 22 and 24 may be covered by suitable mesh-structure guard members for protection of the diaphragms of the speakers.

Figure 2:
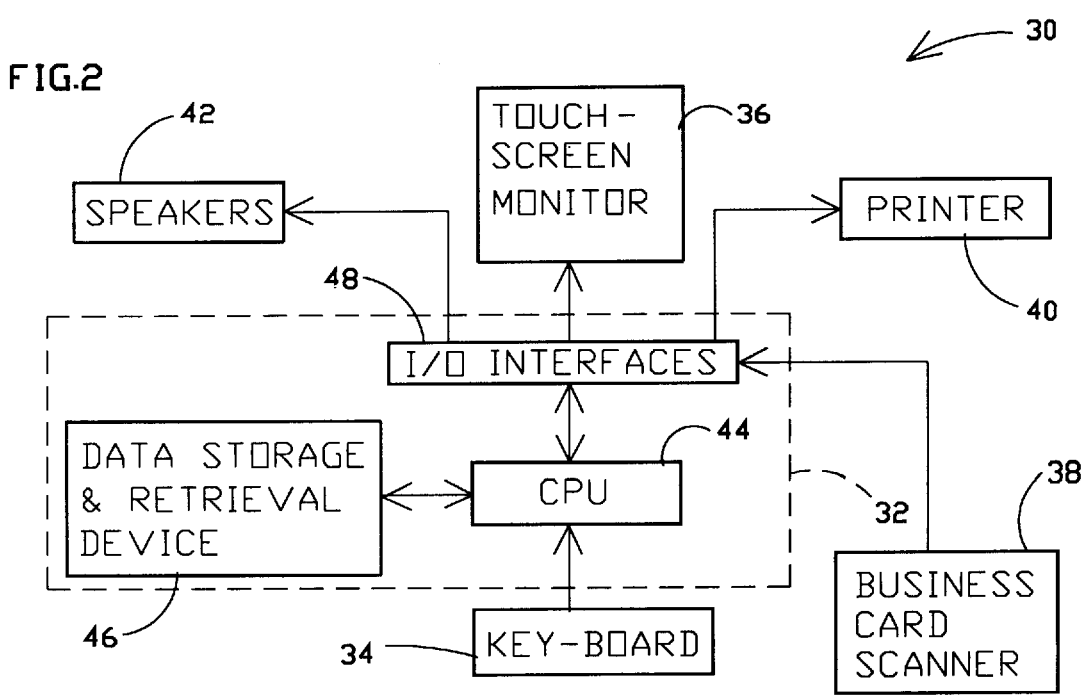
FIG. 2 is a block diagram illustrating the main components of the present invention self-contained computerized interactive multi-media presentation and marketing apparatus.

Referring to FIG. 2, there is shown as 30 a block diagram illustrating the main components of the present invention self-contained computerized interactive multi-media presentation and marketing apparatus. The present invention apparatus primarily includes a computer 32, a key-board 34, a touch-screen monitor 36, a business card scanner 38, a printer 40, and speakers 42. The computer 32 is electronically connected to the key-board 34, the touch-screen monitor 36, the business card scanner 38, the printer 40, and the speakers 42.

The key-board 34 is provided for the owner or operator of the apparatus to perform programming, maintenance and other data retrieval operations. It may be placed inside the housing of the apparatus away from the view of the users, and only accessible through a back door or window of the housing by the owner or operator of the apparatus.

The computer 32 has a central processing unit (CPU) 44, one or more massive data storage devices 46, and input/output (I/O) interfaces 48. The massive data storage devices 46 may include a hard disk drive and/or a compact-disc read-only-memory (CD-ROM) drive and CD-ROMs containing stored data.

Figure 3:
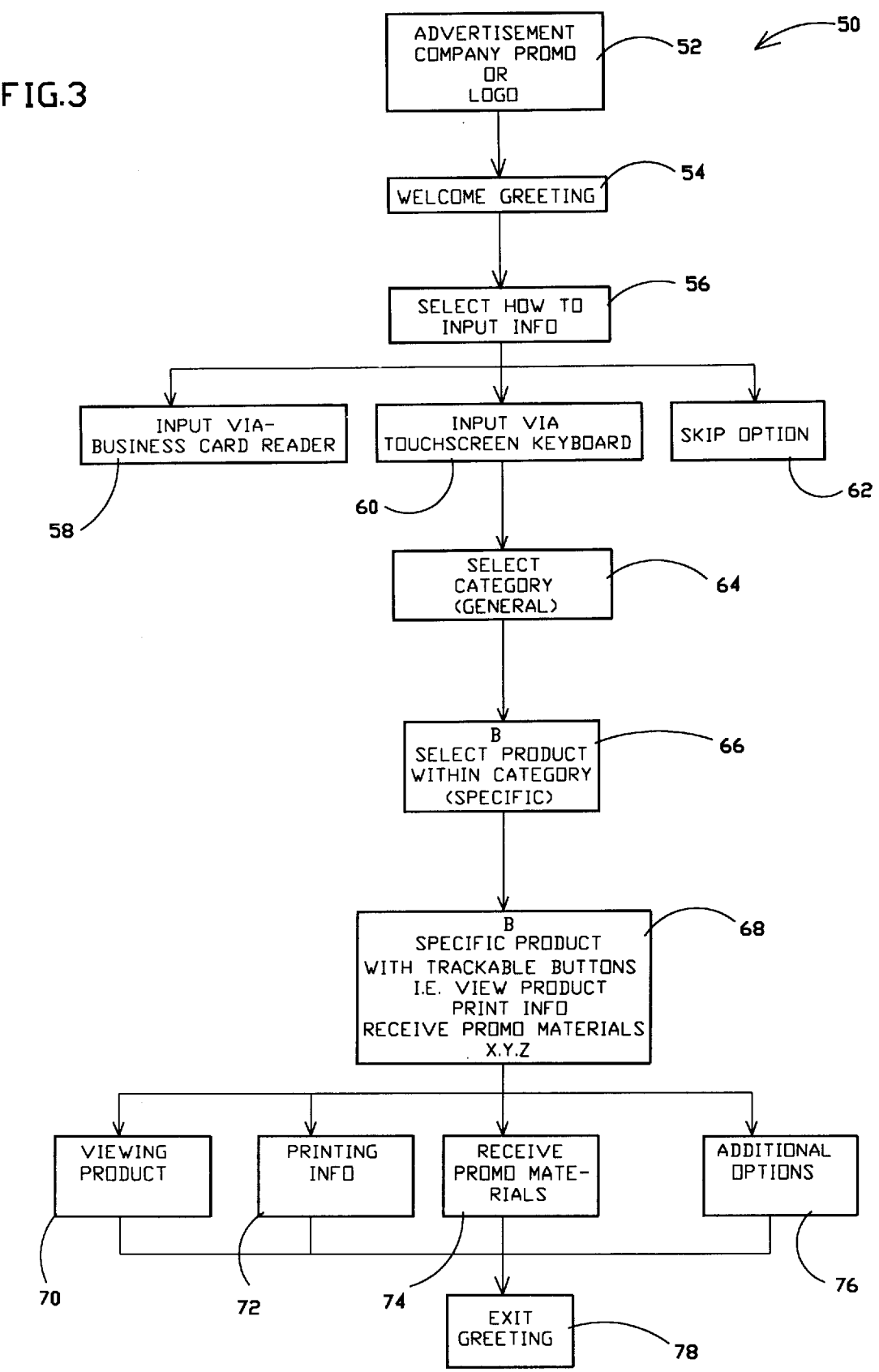
FIG. 3 is a flow-chart diagram illustrating the operation of the present invention self-contained computerized interactive multi-media presentation and marketing apparatus.

The computer 32 is programmed to control other components to perform the functions of the present invention interactive multi-media presentation and marketing apparatus 10. Referring to FIG. 3, there is shown at 50 a flowchart diagram illustrating the operation and functions of the present invention self-contained computerized interactive multi-media presentation and marketing apparatus 10. FIG. 3 represents a typical session during which an interested user has interacted with the apparatus 10. In this Application, the term "session" means a series of interactions between a particular user and the present invention apparatus 10, beginning from the user's first interaction with the present invention apparatus 10 and continuing until the same user exits from the presentation of the present invention apparatus 10.

Figure 4:
FIG. 4 is an illustrative drawing showing a "stand-by" screen, as displayed on the touch screen monitor of the present invention self-contained computerized interactive multi-media presentation and marketing apparatus.

Referring to FIG. 3, as shown at 52, at the beginning of each session, the computer is programmed to present one or more "stand-by" screens on the touch-screen monitor, displaying a business entity's advertisement or promotion material, or the business entity's logo. A sample display 80 of such screens is shown in FIG. 4. A designated area 82 of the screen 80 displays "PLEASE TOUCH HERE TO BEGIN". A user can walk up to the present invention apparatus 10 and touches this area 82 of the touch-screen monitor to start a session.

Figure 5:
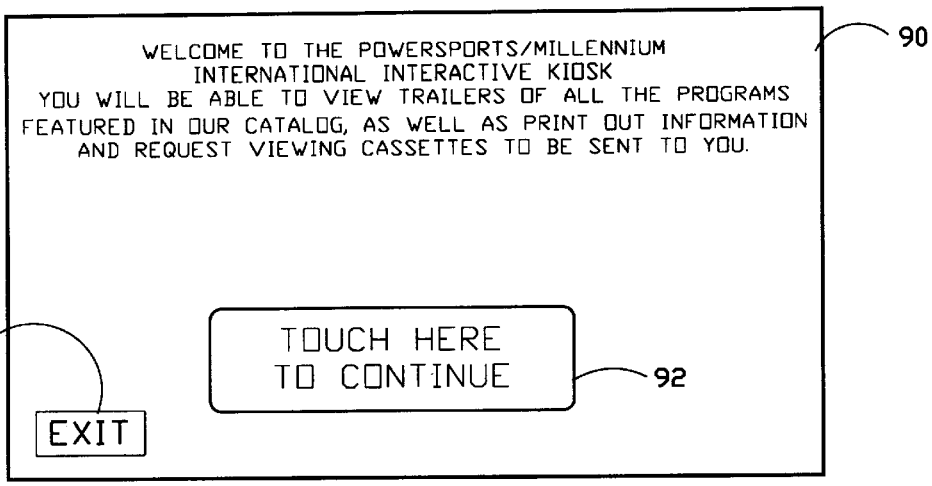
FIG. 5 is an illustrative drawing showing a "greeting" screen, as displayed on the touch screen monitor of the present invention self-contained computerized interactive multi-media presentation and marketing apparatus.

Referring back to FIG. 3, as shown at 54, after the user initiates a session, the computer is programmed to present a greeting screen on the monitor, displaying welcome messages. A sample display 90 of such screen is shown in FIG. 5. A designated area 92 of the screen 90 displays "TOUCH HERE TO CONTINUE". Another designated area 94 of the screen displays "EXIT". The user can touch area 92 of the touch-screen monitor to continue the session, or touch area 94 of the touch-screen monitor to exit the session. If the user exits the session, then the session ends and the computer is programmed to display a "farewell" screen (which will be described later) and then go back to the "stand-by" screens as shown in FIG. 4. This feature is provided in all subsequent presentations throughout the session, and will not be described again.

Figure 6:
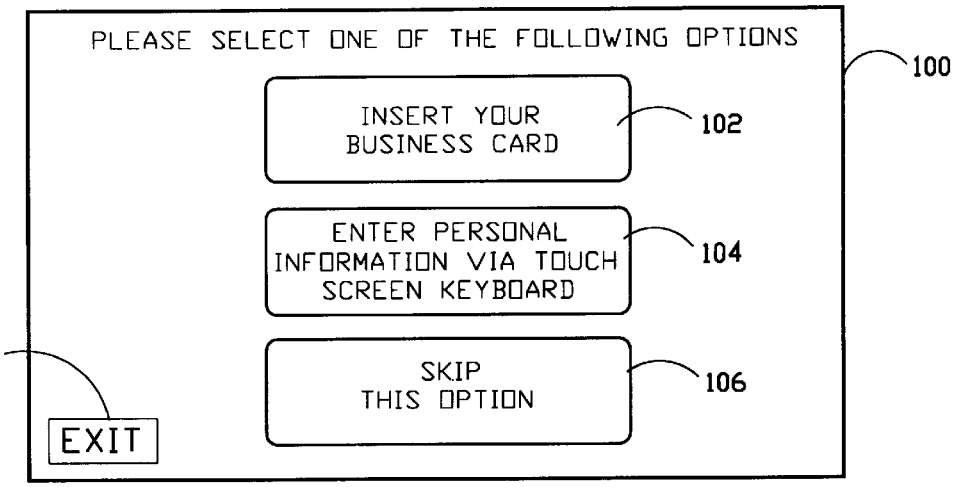
FIG. 6 is an illustrative drawing showing an "instruction" screen, as displayed on the touch screen monitor of the present invention self-contained computerized interactive multi-media presentation and marketing apparatus.

Referring back to FIG. 3, as shown at 56, after the user chooses to continue, the computer is programmed to present an instruction screen on the monitor, displaying alternative options to the user. A sample display 100 of such screen is shown in FIG. 6. A designated area 102 of the screen 100 displays "INSERT YOUR BUSINESS CARD", a second designated area 104 of the screen 100 displays "ENTER PERSONAL INFORMATION VIA TOUCH SCREEN KEYBOARD", a third designated area 106 of the screen 100 displays "SKIP THIS OPTION", and a fourth designated area 108 displays "EXIT" again.

Referring back to FIG. 3, at this point the user is offered three (3) options. The first option as shown at 58 is to input the user's information by utilizing the business card reader. The second option as shown at 60 is to input the user's information by utilizing the touch-screen monitor. The third option is to skip this step and not to provide any personal information of the user. The user can make a choice by touching the respective designated areas on the touch-screen monitor.

Figure 7:
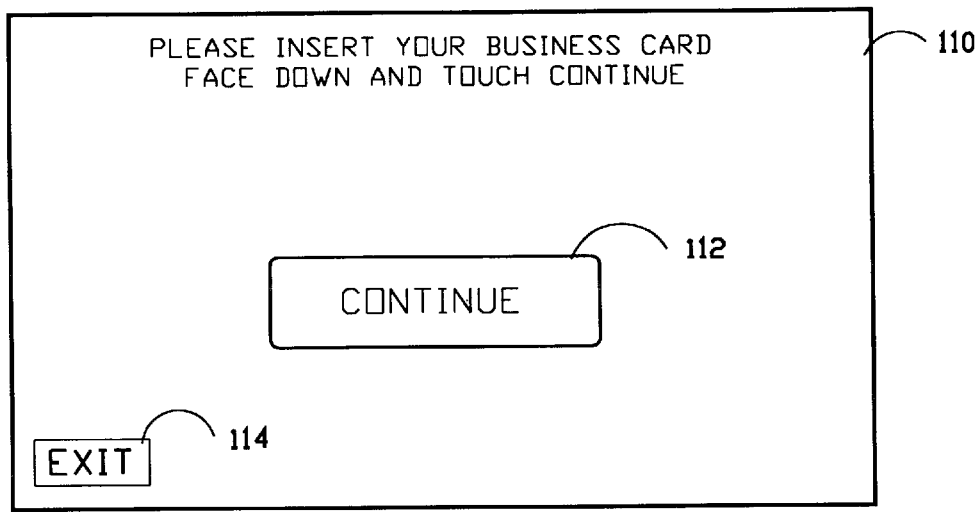
FIG. 7 is an illustrative drawing showing an "option" screen for scanning a user's business card, as displayed on the touch screen monitor of the present invention self-contained computerized interactive multi-media presentation and marketing apparatus.

Referring to FIG. 7, when the user has a business card and elects to input the information via the business card reader, the computer is programmed to display a screen as shown at 110 to instruct the user to insert the business card into the business card reader slot. The computer is further programmed to operate the business card reader for scanning, retrieving and storing information on the business card. The user may touch the designated area 112 to continue.

Figure 8:
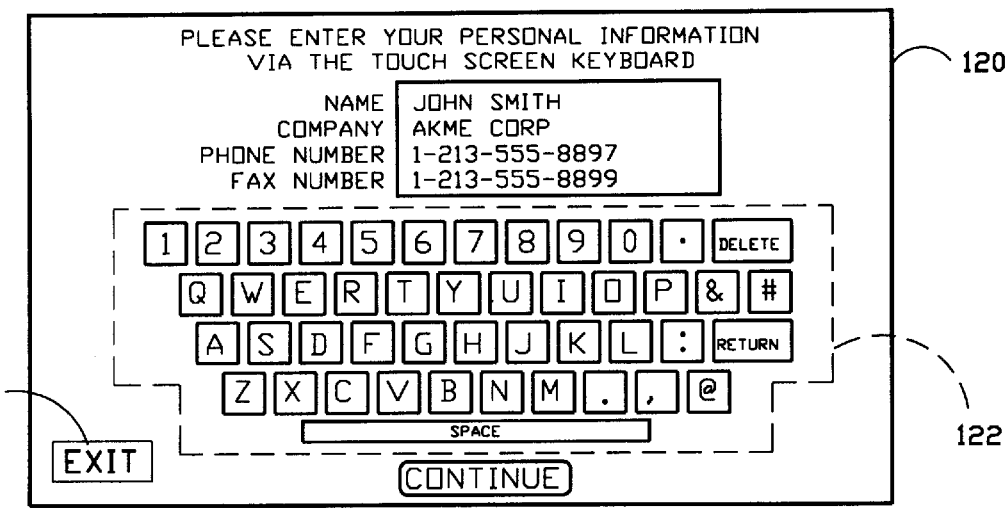
FIG. 8 is an illustrative drawing showing an "alternative option" screen for typing-in a user's information, as displayed on the touch screen monitor of the present invention self-contained computerized interactive multi-media presentation and marketing apparatus.

Referring to FIG. 8, when the user elects to input the information via the touch-screen monitor, the computer is programmed to display a screen as shown at 120 to instruct the user to type-in the information via the on-screen "key-board" 122 (which is not to be confused with the key-board 34 as shown in FIG. 2). The computer is further programmed to operate the touch-screen monitor for receiving, retrieving and storing information as typed-in by the user. The user may touch the designated area 124 to continue.

Figure 9:
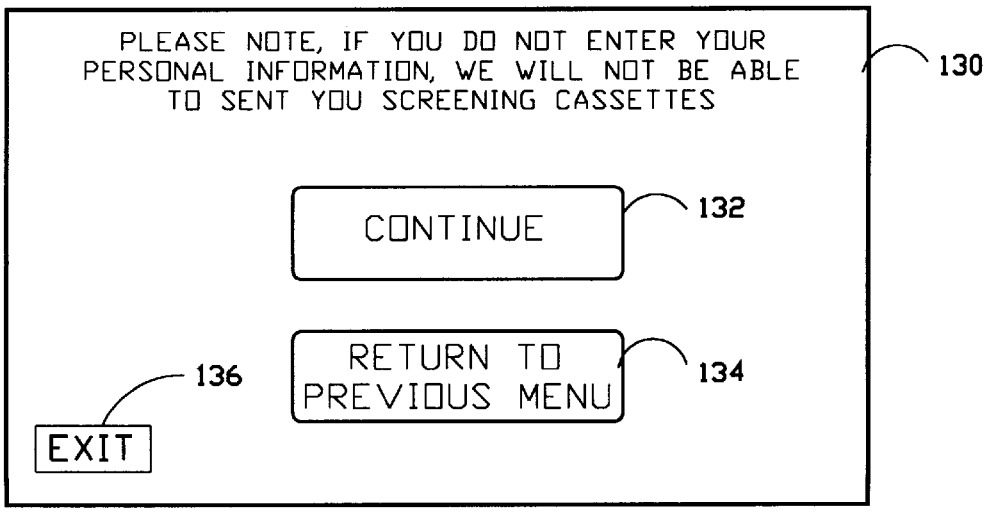
FIG. 9 is an illustrative drawing showing a "warning" screen for skipping information, as displayed on the touch screen monitor of the present invention self-contained computerized interactive multi-media presentation and marketing apparatus.

Referring to FIG. 9, when the user elects not to input the information via the business card reader or the touch-screen monitor, the computer is programmed to display a warning screen as shown at 130 to ask the user to reconsider. If the user changes his or her mind and wants to provide the information, then the user may touch the designated area 134 (which returns the user to the screen display as shown in FIG. 6). Otherwise the user may touch the designated area 132 to continue.

Referring back to FIG. 3, as shown at 64, next the user is allowed to make a general selection among the various categories of the business entity's products. As used in the specification and claims of this application, the terms "product" or "products" also include service or services, respectively. Furthermore, a business entity's products as used here include not only the products manufactured or produced or services provided by the business entity, but also products which are manufactured and produced by other business entities but are distributed or promoted and marketed by the business entity which operates the present invention apparatus, and services which are provided by other business entities but are promoted and marketed by the business entity which operates the present invention apparatus. In this application, as an example only, the products are video programs in various subjects.

Figure 10:
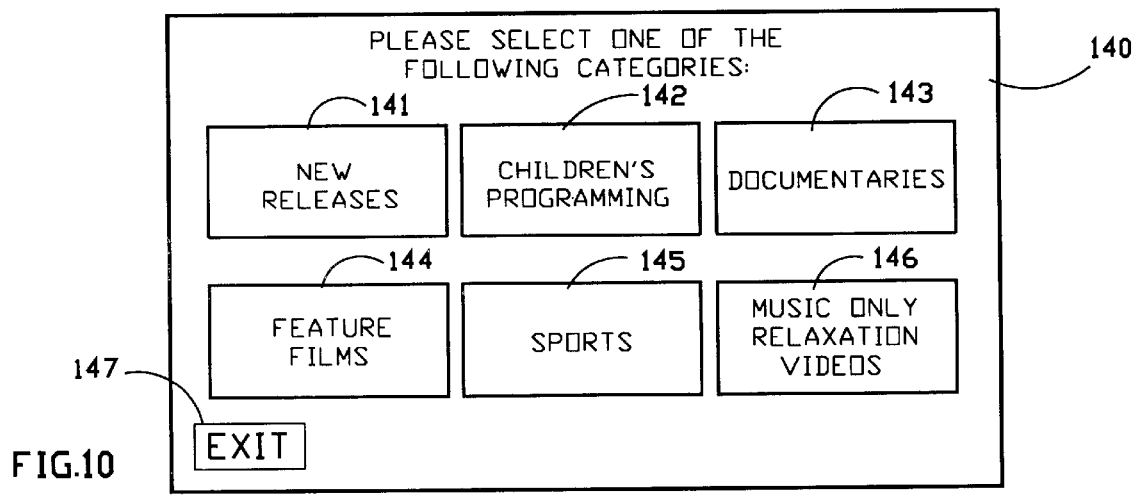
FIG. 10 is an illustrative drawing showing a "general selection" screen displayed on the touch screen monitor of the present invention self-contained computerized interactive multi-media presentation and marketing apparatus.

A sample display 140 of a general selection screen is shown in FIG. 10. For example, at respective designated areas 141, 142, 143, 144, 145, and 146, the user may touch the screen of the touch-screen monitor to make a selection among the categories of "NEW RELEASES", "CHILDREN'S PROGRAMMING", "DOCUMENTARIES", "FEATURE FILMS", "SPORTS", and "MUSIC ONLY RELAXATION VIDEOS".

Figure 11:
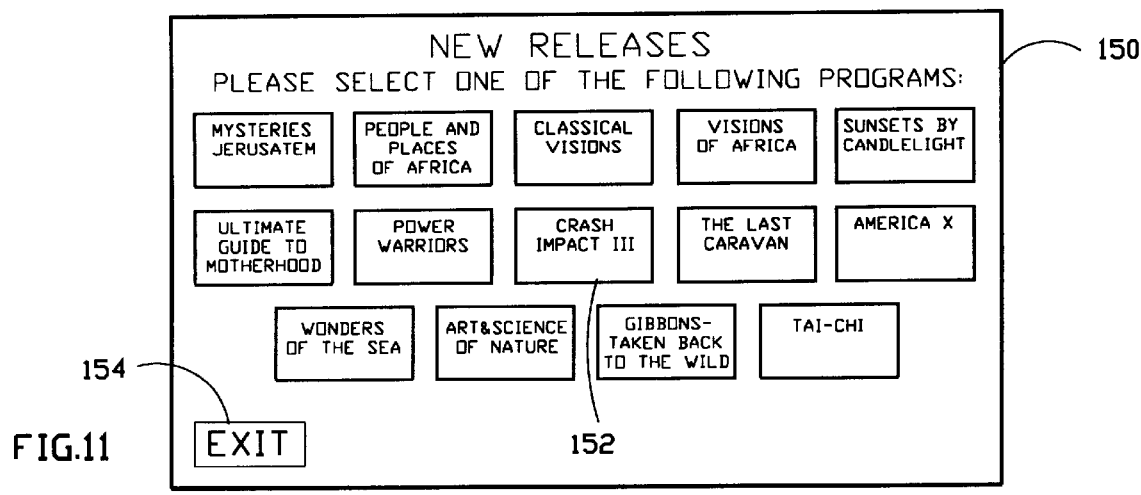
FIG. 11 is an illustrative drawing showing a "specific selection" screen displayed on the touch screen monitor of the present invention self-contained computerized interactive multi-media presentation and marketing apparatus.

Referring back to FIG. 3, as shown at 66, once the user chooses a particular category, the computer is programmed to display one or more screens to allow the user to choose a specific product within that category. A sample display 150 of such specific selection screens is shown in FIG. 11, where the title of various products are displayed at respective designated areas.

Figure 12:
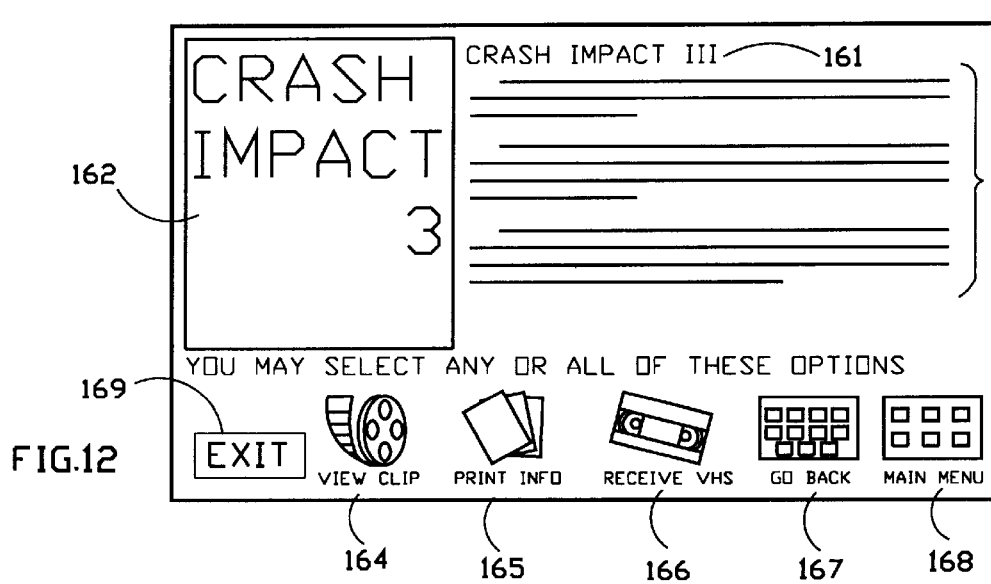
FIG. 12 is an illustrative drawing showing an "introduction" screen displayed on the touch screen monitor of the present invention self-contained computerized interactive multi-media presentation and marketing apparatus.

Referring back to FIG. 3, as shown at 68, after the user makes a selection of a specific product, the computer is programmed to display an "introduction" screen of that specific product. A sample display 160 of a sample program entitled "CRASH IMPACT III" is shown in FIG. 12. The introduction screen 160 typically contains the title 161 of the program, a graphic introduction 162 of the program, a text introduction 163 of the program, and a series option icons 164 through 169 displayed at the bottom of the screen.

The option icons includes a "view clip" option icon 164, "print information" option icon 165, "receive video tape" option icon 166, "go back" option icon 167, "main menu" option icon 168, and "exit" option icon 169. The user can touch one of these option icons to select the desired function of the present invention apparatus.

In other words, as shown in FIG. 3, at this point the user is offered various alternatives to pre-view or examine a specific product. These alternatives include: alternative 70 for viewing the product, alternative 72 for printing information, alternative 76 for receiving promotional materials, and other additional alternatives 76.

When the user elects alternative 70, i.e., to view a video presentation of the specific product, the computer is programmed to retrieve the data of the specific product from the massive data storage and retrieval device, and to present the video presentation at the touch-screen monitor. The user can view the video presentation through the front window on the housing the present invention apparatus.

When the user elects alternative 72, ie., to receive a hard-copy document about the specific product, the computer is programmed to retrieve the data of the specific product from the massive data storage and retrieval device, and to operate the printer to provide the hard-copy document. The user can receive the documents at the delivery opening on the housing of the present invention apparatus.

When the user elects alternative 74, i.e., to request a sample of the specific product, the computer is programmed to record the user's request for subsequent disbursement of the sample of the specific product.

Referring back to FIG. 3, as shown at 78, when the user exits the session, the computer is programmed to present a "farewell" screen on the monitor. A sample display 170 of such screen is shown in FIG. 13. Thereafter the computer is programmed to go back to the "stand-by" screens as shown in FIG. 4.

Throughout the presentation session, the user is actively engaged in interaction with the present invention apparatus, in that the apparatus prompts various options to the user and responds to the user's selections. In addition, the computer is programmed to provide corresponding audio dialogues, music, and other sound effect through the speakers, to present a multi-media environment for the user to use the present invention apparatus.

A very important feature of the present invention apparatus is its ability to keep tracking on all responses and activities of the user and record the response and activities made by a user during a session. The computer records each user's response and activities in a particular session into a retrievable record which is marked with indicia for the purpose of identifying the record with that user's information.

Referring to FIG. 14, there is shown at 180 a sample tracking file compiled by the present invention self-contained computerized interactive multi-media presentation and marketing apparatus. The file shows the record of a particular session of one user, with the indicia of "filename is 317D98B1.BMP" which identifies a corresponding bit-map file containing the information scanned from that user's business card. This record can be compiled with other records of other users' different sessions and stored in a database, which can provide valuable market information.

Referring to FIG. 15, there is shown an image scanned and stored as a graphic image file of the business card, which is a bitmap file with the filename identified in the tracking record.

Defined in detail, the present invention is an interactive multi-media presentation and marketing apparatus for a business entity to present its products to an audience, and to monitor and track the responses from the audience, the apparatus comprising: (a) a self-contained stand-alone housing for containing a computer, a key-board, a touch-screen monitor, a business card scanner, a printer and at least one speaker, where the housing has a front monitor window for the touch-screen monitor, a business card slot for the business card scanner, and a delivery opening for the printer; (b) the computer being programmed to present at least one greeting screen on the monitor, followed by at least one instruction screen requesting a user of the audience to make a selection of method for inputting information about the user; (c) the computer being electronically connected to the business card reader, and when the user elects to insert and then inserts the user's business card into the business card slot on the housing, the computer is programmed to operate the business card reader for scanning, and to retrieve and store information on the business card of the user; (d) the computer also being electronically connected to the touch-screen monitor, and when the user elects to type and then types the user's information on the touch-screen monitor, the computer is programmed to operate the touch-screen monitor for receiving, retrieving and storing information typed-in by the user; (e) the computer also being programmed to present at least one general election screen on the touch-screen monitor to let the user to make a selection of a particular category of products, and after the user elects a category, to present at least one specific election screen on the touch-screen monitor to let the user to make a selection of a specific product; (f) the computer including at least one massive data storage and retrieval device for storing and retrieving information on the business entity's products, and the computer being further programmed to present the information to the user based on the user's election of a multiplicity of presenting options; (g) when the user elects to view a video presentation of the specific product, the computer is programmed to retrieve from the massive data storage and retrieval device, and to present at the touch-screen monitor, the video presentation of the specific product; (h) the computer being further electronically connected to the printer, and when the user elects to receive a hard-copy document about the specific product, the computer is programmed to retrieve data from the massive data storage and retrieval device, and to operate the printer to provide the hard-copy document; (i) when the user elects to request a sample of the specific product, the computer is programmed to record the user's request for subsequent disbursement of the sample of the specific product; (j) the computer being further programmed to track all responses and activities of the user and record the response and activities in a retrievable record which is marked with indicia for identifying the record with the user's available information; (k) the computer being further electronically connected to the at least one speaker to provide audio presentation in supplement to the video presentation on the touch-screen monitor; and (1) the computer being additionally electronically connected to the key-board for inputting instructions to the computer for retrieval of the record of responses and activities and the information about the user for marketing purposes.

Defined broadly, the present invention is an interactive multi-media presentation and marketing apparatus for a business entity to present its products to an audience, and to monitor and track the responses from the audience, the apparatus comprising: (a) a self-contained stand-alone housing for containing a computer, a touch-screen monitor, a business card scanner and at least one speaker, where the housing has a front monitor window for the touch-screen monitor, and a business card slot for the business card scanner; (b) the computer being programmed to present at least one instruction screen requesting a user of the audience to make a selection of method for inputting information about the user; (c) the computer being electronically connected to the business card reader, and when the user elects to insert and then inserts the user's business card into the business card slot on the housing, the computer is programmed to operate the business card reader for scanning, and to retrieve and store information on the business card of the user; (d) the computer also being electronically connected to the touch-screen monitor, and when the user elects to type and then types the user's information on the touch-screen monitor, the computer is programmed to operate the touch-screen monitor for receiving, retrieving and storing information typed-in by the user; (e) the computer also being programmed to present at least one election screen on the touch-screen monitor to let the user to make a selection of a specific product; (f) the computer including at least one massive data storage and retrieval device for storing and retrieving information on the business entity's products, and the computer being further programmed to present the information to the user based on the user's election of a multiplicity of presenting options, including viewing video presentation of the specific product on the monitor, receiving a hard-copy document about the specific product, and requesting subsequent delivery of further information with regard to the specific product; (g) the computer being further programmed to track all responses and activities of the user and record the response and activities in a retrievable record which is marked with indicia for identifying the record with the user's available information; and (h) the computer being further electronically connected to the at least one speaker to provide audio presentation in supplement to the video presentation on the touch-screen monitor.

Defined more broadly, the present invention is an interactive multi-media presentation and marketing apparatus for a business entity to present its products to an audience, and to monitor and track the responses from the audience, the apparatus comprising: (a) a self-contained stand-alone housing for containing a computer, a touch-screen monitor, and a business card scanner, where the housing has a front monitor window for the touch-screen monitor, and a business card slot for the business card scanner; (b) the computer being electronically connected to the business card reader, and when a user from the audience inserts the user's business card into the business card slot on the housing, the computer is programmed to operate the business card reader for scanning, and to retrieve and store information on the business card of the user; (c) the computer also being electronically connected to the touch-screen monitor, and when the user elects to type-in the user's information on the touch-screen monitor, the computer is programmed to operate the touch-screen monitor for receiving, retrieving and storing information typed-in by the user; (d) the computer including at least one massive data storage and retrieval device for storing and retrieving information on the business entity's products, and the computer being further programmed to present the information to the user based on the user's request; and (e) the computer being further programmed to track all responses and activities of the user and record the response and activities in a retrievable record which is marked with indicia for identifying the record with the user's available information.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An interactive multi-media presentation and marketing apparatus for a business entity to present its products to an audience, and to monitor and track the responses from the audience, the apparatus comprising:

a. a self-contained stand-alone housing for containing a computer, a key-board, a touch-screen monitor, a business card scanner, a printer and at least one speaker, where the housing has a front monitor window for the touch-screen monitor, a business card slot for the business card scanner, and a delivery opening for the printer;

b. said computer being programmed to present at least one greeting screen on said monitor, followed by at least one instruction screen requesting a user of said audience to make a selection of method for inputting information about the user;

c. said computer being electronically connected to said business card reader, and when said user elects to insert and then inserts the user's business card into said business card slot on said housing, said computer is programmed to operate said business card reader for scanning, and to retrieve and store information on said business card of said user;

d. said computer also being electronically connected to said touch-screen monitor, and when said user elects to type and then types the user's information on said touch-screen monitor, said computer is programmed to operate said touch-screen monitor for receiving, retrieving and storing information typed-in by said user;

e. said computer also being programmed to present at least one general election screen on said touch-screen monitor to allow said user to make a selection of a particular category of products, and after said user elects a category, to present at least one specific election screen on said touch-screen monitor to allow said user to make a selection of a specific product;

f. said computer including at least one massive data storage and retrieval device for storing and retrieving information on said business entity's products, and said computer being further programmed to present said information to said user based on said user's election of a multiplicity of presenting options;

g. when said user elects to view a video presentation of said specific product, said computer is programmed to retrieve from said massive data storage and retrieval device, and to present at said touch-screen monitor, the video presentation of said specific product;

h. said computer being further electronically connected to said printer, and when said user elects to receive a hard-copy document about said specific product, said computer is programmed to retrieve data from said massive data storage and retrieval device, and to operate said printer to provide the hard-copy document;

i. when said user elects to request a sample of said specific product, said computer is programmed to record said user's request for subsequent disbursement of the sample of said specific product;

j. said computer being further programmed to track all responses and activities of said user and record the response and activities in a retrievable record which is marked with indicia for identifying the record with said user's available information;

k. said computer being further electronically connected to said at least one speaker to provide audio presentation to supplement to said video presentation on said touch-screen monitor; and l. said computer being additionally electronically connected to said key-board for inputting instructions to said computer for retrieval of said record of responses and activities and said information about said user for marketing purposes.

2. The apparatus as defined in claim 1 wherein said computer is further programmed to offer an option to said user to skip both the scanning of a business card by said business card scanner and the typing of said user's information on said touch-screen monitor.

3. The apparatus as defined in claim 1 wherein said computer is further programmed to allow said user to go to a main menu.

4. The apparatus as defined in claim 1 wherein said computer is further programmed to allow said user to exit the presentation.

5. The apparatus as defined in claim 1 wherein said at least one massive data storage and retrieval device includes a hard disk drive.

6. The apparatus as defined in claim 1 wherein said at least one massive data storage and retrieval device includes a compact-disc read-only-memory (CD-ROM) drive.

7. An interactive multi-media presentation and marketing apparatus for a business entity to present its products to an audience, and to monitor and track the responses from the audience, the apparatus comprising:

a. a self-contained stand-alone housing for containing a computer, a touch-screen monitor, a business card scanner and at least one speaker, where the housing has a front monitor window for the touch-screen monitor, and a business card slot for the business card scanner;

b. said computer being programmed to present at least one instruction screen requesting a user of said audience to make a selection of method for inputting information about the user;

c. said computer being electronically connected to said business card reader, and when said user elects to insert and then inserts the user's business card into said business card slot on said housing, said computer is programmed to operate said business card reader for scanning, and to retrieve and store information on said business card of said user;

d. said computer also being electronically connected to said touch-screen monitor, and when said user elects to type and then types the user's information on said touch-screen monitor, said computer is programmed to operate said touch-screen monitor for receiving, retrieving and storing information typed-in by said user;

e. said computer also being programmed to present at least one election screen on said touch-screen monitor to allow said user to make a selection of a specific product;

f. said computer including at least one massive data storage and retrieval device for storing and retrieving information on said business entity's products, and said computer being further programmed to present said information to said user based on said user's election of a multiplicity of presenting options, including viewing video presentation of said specific product on said monitor, receiving a hard-copy document about said specific product, and requesting subsequent delivery of further information with regard to said specific product;

g. said computer being further programmed to track all responses and activities of said user and record the response and activities in a retrievable record which is marked with indicia for identifying the record with said user's available information; and h. said computer being further electronically connected to said at least one speaker to provide audio presentation to supplement to the video presentation on said touch-screen monitor.

8. The apparatus as defined in claim 7 wherein said computer is further programmed to offer an option to said user to skip both the scanning of a business card by said business card scanner and the typing of said user's information on said touch-screen monitor.

9. The apparatus as defined in claim 7 wherein said computer is further programmed to allow said user to go to a main menu.

10. The apparatus as defined in claim 7 wherein said computer is further programmed to allow said user to go back to a previous screen of said presentation.

11. The apparatus as defined in claim 7 wherein said computer is further programmed to allow said user to exit the presentation.

12. The apparatus as defined in claim 7 wherein said computer is also programmed to present at least one greeting screen on said monitor to welcome said user.

13. The apparatus as defined in claim 7 wherein said computer is also programmed to present at least one additional election screen on said touch-screen monitor to allow said user to make a selection of a particular category of products before said user selects said specific product.

14. The apparatus as defined in claim 7 wherein said at least one massive data storage and retrieval device includes a hard disk drive.

15. The apparatus as defined in claim 7 wherein said at least one massive data storage and retrieval device includes a compact-disc read-only-memory (CD-ROM) drive.

16. The apparatus as defined in claim 7 wherein when said user elects to view said video presentation of said specific product, said computer is programmed to retrieve from said massive data storage and retrieval device, and to present at said touch-screen monitor, said video presentation of said specific product.

17. The apparatus as defined in claim 7 wherein said computer is further electronically connected to a printer, and when said user elects to receive said hard-copy document about said specific product, said computer is programmed to retrieve data from said massive data storage and retrieval device, and to operate the printer to provide said hard-copy document.

18. The apparatus as defined in claim 7 wherein the housing also has a delivery opening for said printer.

19. The apparatus as defined in claim 7 wherein when said user elects to request subsequent delivery of further information with regard to said specific product, and said computer is programmed to record said user's request for subsequent disbursement of the further information of said specific product.

20. The apparatus as defined in claim 7 wherein said computer is also electronically connected to a key-board for inputting instructions to said computer for retrieval of said record of responses and activities and said information about said user for marketing purposes.

21. An interactive multi-media presentation and marketing apparatus for a business entity to present its products to an audience, and to monitor and track the responses from the audience, the apparatus comprising:

a. a self-contained stand-alone housing for containing a computer, a touch-screen monitor, and a business card scanner, where the housing has a front monitor window for the touch-screen monitor, and a business card slot for the business card scanner;

b. said computer being electronically connected to said business card reader, and when a user from said audience inserts the user's business card into said business card slot on said housing, said computer is programmed to operate said business card reader for scanning, and to retrieve and store information on said business card of said user;

c. said computer also being electronically connected to said touch-screen monitor, and when said user elects to type-in the user's information on said touch-screen monitor, said computer is programmed to operate said touch-screen monitor for receiving, retrieving and storing information typed-in by said user;

d. said computer including at least one massive data storage and retrieval device for storing and retrieving information on said business entity's products, and said computer being further programmed to present said information to said user based on said user's request; and e. said computer being further programmed to track all responses and activities of said user and record the response and activities in a retrievable record which is marked with indicia for identifying the record with said user's available information.

22. The apparatus as defined in claim 21 wherein said computer is further programmed to offer an option to said user to skip both the scanning of a business card by said business card scanner and the typing of said user's information on said touch-screen monitor.

23. The apparatus as defined in claim 21 wherein said computer is further programmed to allow said user to go to a main menu.

24. The apparatus as defined in claim 21 wherein said computer is further programmed to allow said user to go back to a previous screen of said presentation.

25. The apparatus as defined in claim 21 wherein said computer is further programmed to allow said user to exit the presentation.

26. The apparatus as defined in claim 21 wherein said computer is also programmed to present at least one greeting screen on said monitor to welcome said user.

27. The apparatus as defined in claim 21 wherein said computer is programmed to present at least one instruction screen requesting said user of said audience to make a selection of method for inputting information about the user.

28. The apparatus as defined in claim 21 wherein said computer is also programmed to present at least one election screen on said touch-screen monitor to allow said user to make a selection of a specific product.

29. The apparatus as defined in claim 28 wherein said computer is also programmed to present at least one additional election screen on said touch-screen monitor to allow said user to make a selection of a particular category of products before said user selects said specific product.

30. The apparatus as defined in claim 28 wherein said at least one massive data storage and retrieval device includes a hard disk drive.

31. The apparatus as defined in claim 21 wherein said at least one massive data storage and retrieval device includes a compact-disc read-only-memory (CD-ROM) drive.

32. The apparatus as defined in claim 21 wherein said computer is further programmed to allow said user to made a selection from a multiplicity of presenting options, including viewing video presentation of said specific product on said monitor, receiving a hard-copy document about said specific product, and requesting subsequent delivery of further information with regard to said specific product.

33. The apparatus as defined in claim 32 wherein when said user elects to view said video presentation of said specific product, said computer is programmed to retrieve from said massive data storage and retrieval device, and to present at said touch-screen monitor, said video presentation of said specific product.

34. The apparatus as defined in claim 32 wherein said computer is further electronically connected to a printer, and when said user elects to receive said hard-copy document about said specific product, said computer is programmed to retrieve data from said massive data storage and retrieval device, and to operate the printer to provide said hard-copy document.

35. The apparatus as defined in claim 34 wherein the housing also has a delivery opening for the printer.

36. The apparatus as defined in claim 32 wherein when said user elects to request subsequent delivery of further information with regard to said specific product, said computer is programmed to record said user's request for subsequent disbursement of the further information of said specific product.

37. The apparatus as defined in claim 21 wherein said computer is also electronically connected to a key-board for inputting instructions to said computer for retrieval of said record of responses and activities and said information about said user for marketing purposes.

38. The apparatus as defined in claim 21 wherein said computer is further electronically connected to at least one speaker to provide audio presentation in supplement to the video presentation on said touch-screen monitor.

* * * * *